United States Patent [19]

Hosokawa et al.

[11] Patent Number: 5,238,392

[45] Date of Patent: Aug. 24, 1993

[54] PRESSURE MOLDING APPARATUS FOR MOLTEN RESIN HAVING A LIMIT SWITCH WHICH DETECTS MOVEMENT OF A GATE PIN

[75] Inventors: Toshihiro Hosokawa; Kiyoshi Nakahara; Ryuichi Ishitsubo; Toshiyuki Okuda, all of Osaka, Japan

[73] Assignee: Hosokawa Seisakushi Company, Ltd., Osaka, Japan

[21] Appl. No.: 852,897

[22] Filed: Mar. 18, 1992

Related U.S. Application Data

[63] Continuation of Ser. No. 536,827, Jun. 12, 1990, abandoned.

[30] Foreign Application Priority Data

Jun. 13, 1989 [JP] Japan ............... 1-69156[U]
Jun. 14, 1989 [JP] Japan ............... 1-69468[U]

[51] Int. Cl.⁵ .................................................. B29C 45/23
[52] U.S. Cl. .................................. 425/564; 425/570; 425/572; 425/577
[58] Field of Search ............... 425/562, 563, 564, 566, 425/570, 572, 577

[56] References Cited

U.S. PATENT DOCUMENTS

| | | | |
|---|---|---|---|
| 4,106,887 | 8/1978 | Yasuike et al. | 425/567 |
| 4,389,358 | 6/1983 | Hendry | 425/562 |
| 4,395,222 | 7/1983 | Gaiser et al. | 425/572 |
| 4,470,796 | 9/1984 | Stroup et al. | 425/572 |
| 4,512,730 | 4/1985 | Kudert et al. | 425/130 |
| 4,669,971 | 6/1987 | Gellert | 425/570 |
| 4,702,689 | 10/1987 | Schmidt et al. | 425/564 |
| 4,958,676 | 9/1990 | Kuntz | 425/577 |

Primary Examiner—Jay H. Woo
Assistant Examiner—Robert B. Davis
Attorney, Agent, or Firm—Armstrong, Westerman, Hattori, McLeland & Naughton

[57] ABSTRACT

A pressure molding apparatus for supplying molten resin to a mold includes a gate unit having an aperture therein for passage of molten resin into a mold cavity of the mold, a gate pipe connected for communication with the gate unit, and a gate pin which is axially movable within the gate pipe. The gate pin has a gate pin end at one end and a tip at another end thereof, the tip being engageable with the aperture for controlling flow of molten resin through the gate unit. The apparatus also includes a manifold pipe for supplying molten resin to the gate pipe, a connection arrangement for connecting the gate pipe to the manifold pipe. The connection arrangement includes a receiving portion for receiving molten resin from the manifold pipe, the gate pin passing completely through the receiving portion and the gate pin end extending beyond the connection arrangement. A limit switch arrangement is provided for detecting movement of the gate pin end to a predetermined position, the limit switch arrangement producing a signal indicative of whether the gate pin end is at the predetermined position. A molten-resin supply pipeline is also provided which includes a base pipe for supplying the molten resin to the interior of the manifold pipe, and the base pipe is connected to the manifold pipe by a pillar pipe.

2 Claims, 6 Drawing Sheets

PRESSURE MOLDING APPARATUS FOR MOLTEN RESIN HAVING A LIMIT SWITCH WHICH DETECTS MOVEMENT OF A GATE PIN

This application is a continuation of application Ser. No. 536,827 filed Jun. 12, 1990 now abandoned.

FIELD OF THE INVENTION

The present invention relates to a pressure molding apparatus for molten resin, wherein the object of the invention is to provide a pressure molding apparatus for molten resin which can smoothly feed molten resin to the interior of molding unit without obstruction even if either the molten-resin supply pipeline base or the manifold pipes thermally elongate or contract themselves.

BACKGROUND OF THE INVENTION

Owing to economic advantage, compatibility for freely shaping final products, and light weight, molded goods are widely used for a variety of industrial fields including manufacture of automobiles and electric appliances for example in an extremely large quantity today.

As is described later on, molded plastic goods are conventionally produced by applying injection molding process.

However, in recent years, some of those skilled in the art have introduced a system for molding resin by applying such a molten-resin pressing and molding apparatus provided with a molding unit composed of upper and lower molds (a) and (b) shown in FIG. 4A through D like the one devised by inventors of this invention.

This conventional molten-resin pressing and molding apparatus presses and molds molten resin after being fed to the interior of mold (c) from a gate aperture of lower mold (b) of molding unit composed of upper and lower molds (a) and (b).

DESCRIPTION OF THE PRIOR ART

Typically, molten-resin supply of any conventional molten-resin pressing and molding apparatus has such a structure in which a plurality of manifold pipes are connected in parallel to the molten-resin supply pipeline base composed of single base pipe in order to feed molten resin from the molten-resin supply pipeline base to gate pipe (e) through manifold pipes before eventually feeding molten resin to the interior of molding unit(c) from a gate aperture (d) provided at the tip of the gate pipe (e).

As shown in FIG. 5, these manifold pipes and the gate pipe (e) are connected to each other by means of structure in which the bottom of the gate pipe (e) is provided with bilge-like curve (f) where the curve (f) remains in contact with aperture (h) open to the upper surface close to the tip of the manifold pipes (g).

The clearance between the curved bottom (f) and the upper surface close to the peripheral edge of the aperture (h) is sealed by means of O-ring (i).

PROBLEMS TO BE SOLVED BY THE INVENTION

The conventional molten-resin pressing and molding apparatus cited above has a mechanical structure in which a plurality of manifold pipes are connected in parallel to the molten-resin supply pipeline base composed of a single base pipe.

As a result, if the molten-resin supply pipeline thermally elongates or contracts itself, in particular, positions of these manifold pipes (g) at both ends of the longitudinal direction of the molten-resin supply pipeline base deviate.

This results in the incomplete connection between the displaced manifold pipes (g) and the gate pipe (e), thus eventually causing molten resin to externally leak.

Furthermore, the O-ring (i) sealing the manifold pipes (g) and the gate pipe (e) is displaced by the thermally elongated manifold pipes(g) to result in the occurrence of clearance between the O-ring (i), the manifold pipes (g) and the gate pipe (e).

Consequently, molten resin leaks out of the clearance.

Furthermore, when the O-ring (i) is worn out after serving for a long period of time, a factory operator is obliged to replace the worn-out O-ring (i) with the new one in the course of disassembly of the sealing mechanism, and yet, the replacing work is quite troublesome.

DESCRIPTION OF THE PREFERRED EMBODIMENTS

Figure 1:
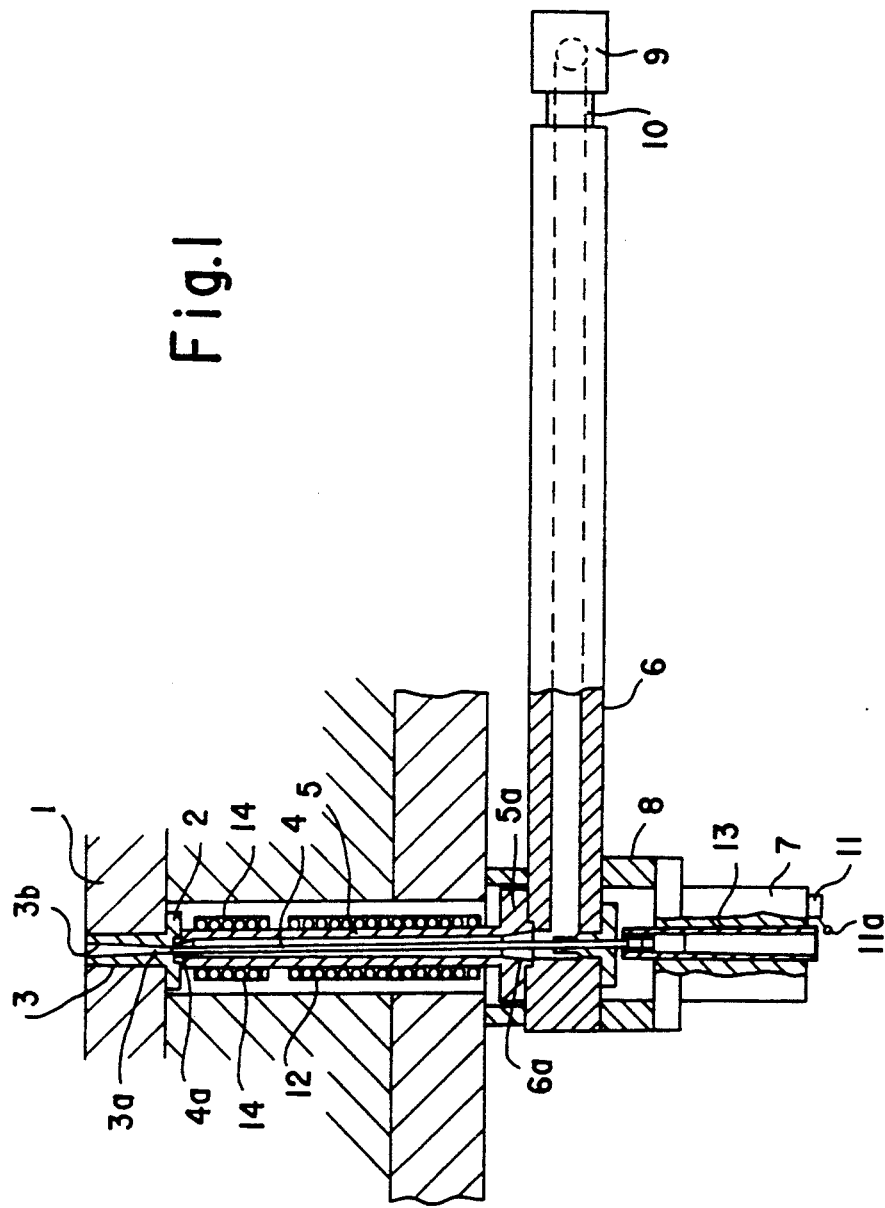
FIG. 1 illustrates the partially sectional front view of essential components of the pressure molding apparatus for molten resin for embodiment by the invention.
Figure 2:
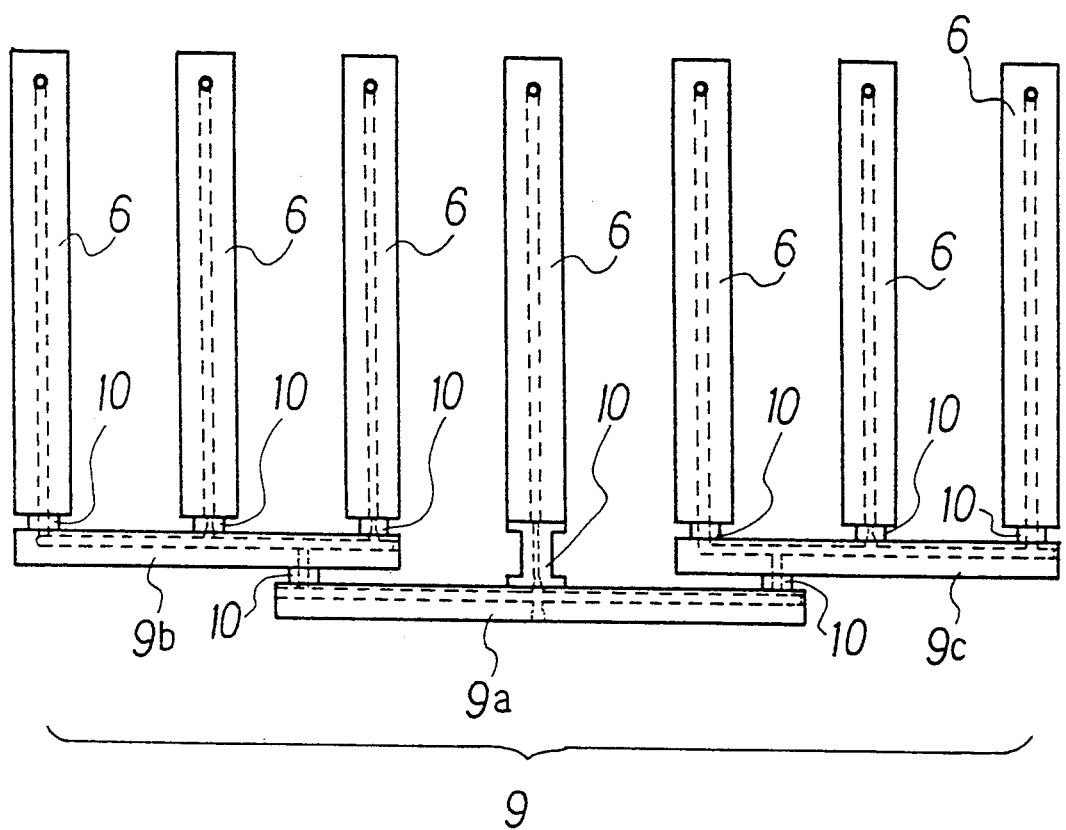
FIG. 2 illustrates the plan of essential components of the molten-resin supply system of the pressure molding apparatus for molten resin shown in FIG. 1.
Figure 3:
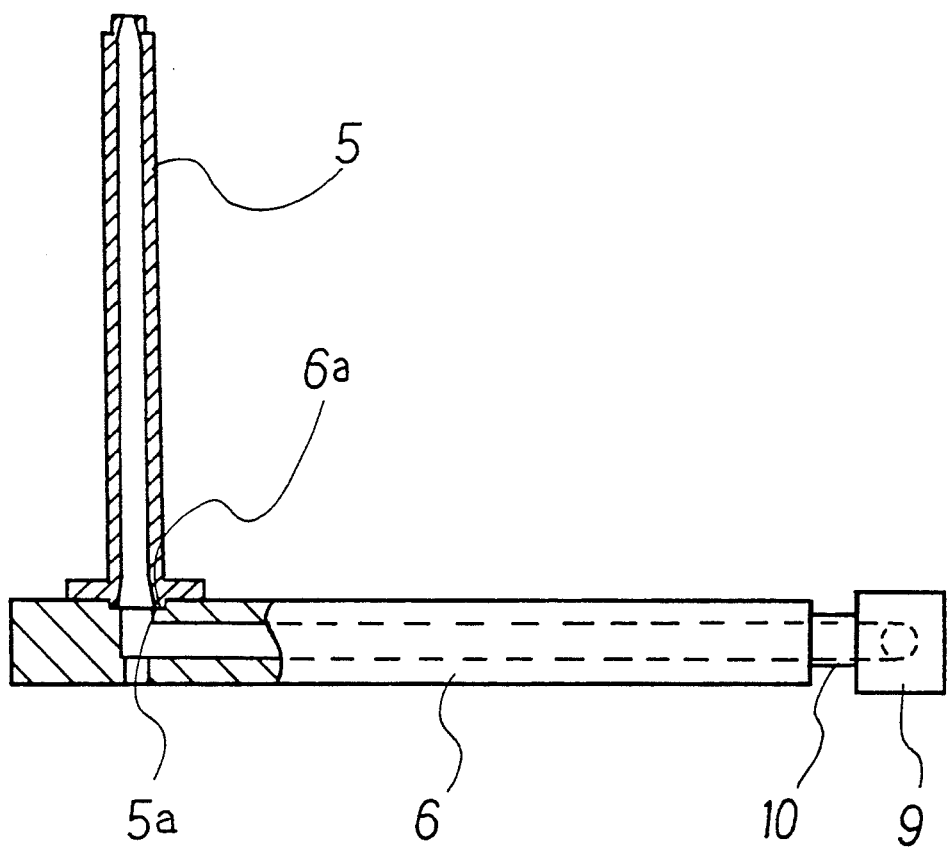
FIG. 3 illustrates the partially sectional front view of the juncture of the manifold pipes and the gate pipe of the pressure molding apparatus for molten resin shown in FIG. 1.
Figure 4A:
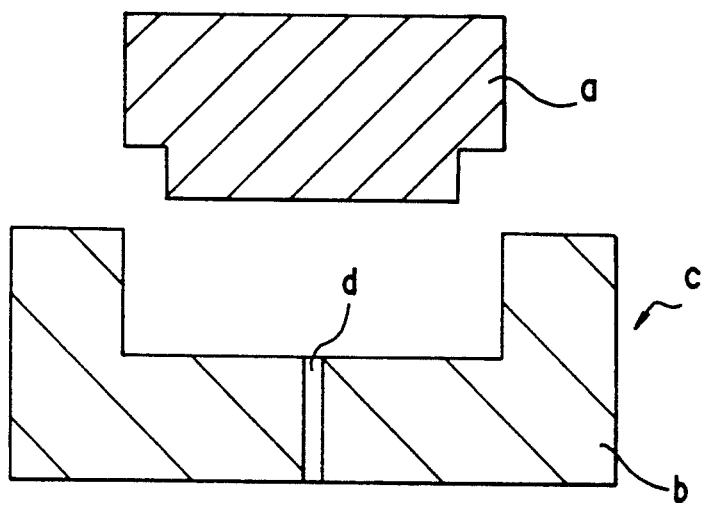
FIG. 4 A through D respectively illustrates the sectional view of a conventional pressure molding apparatus for molten resin.
Figure 4B:
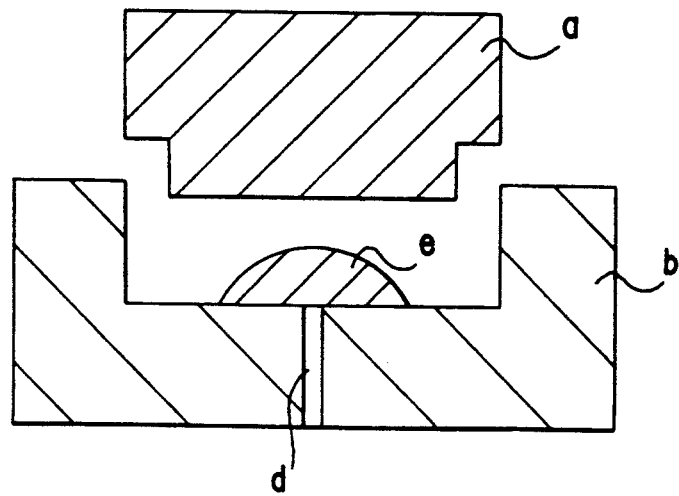
Figure 4C:
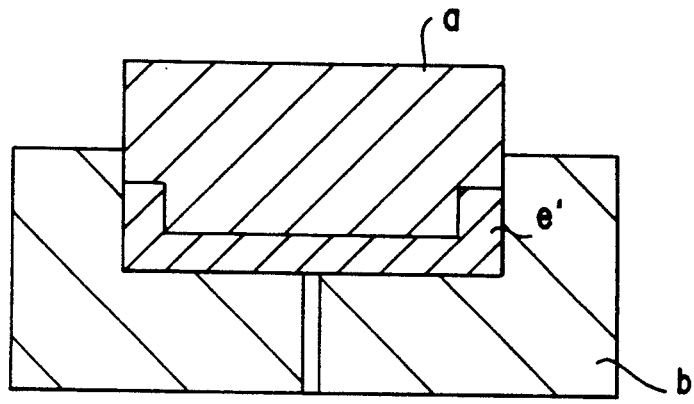
Figure 4D:
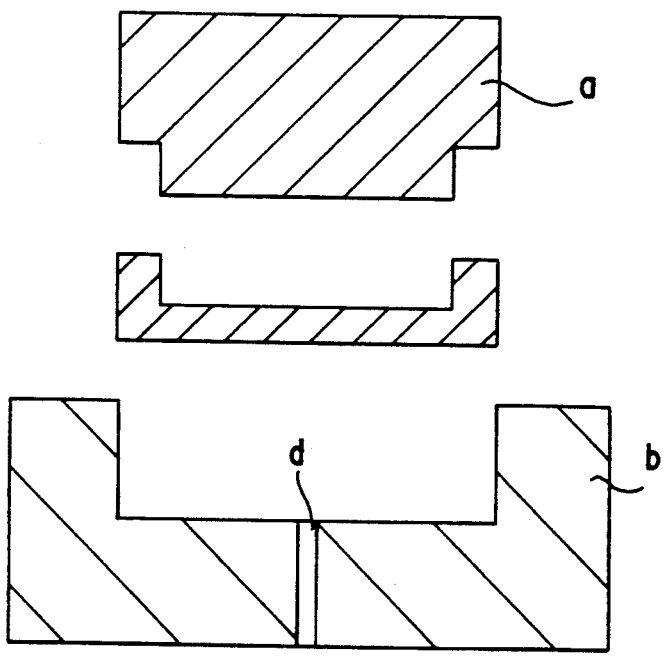
Figure 5:
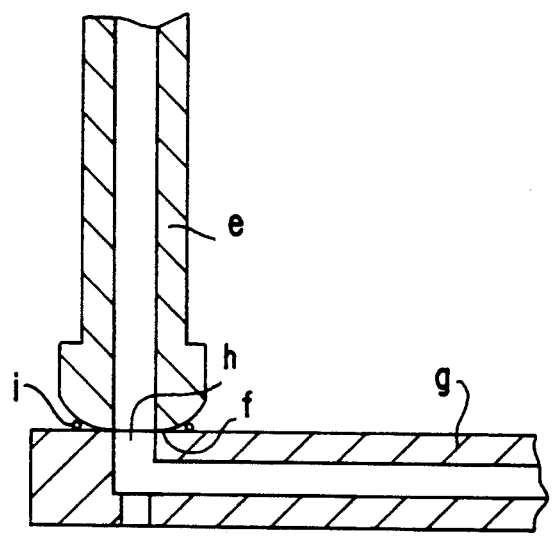
FIG. 5 illustrates the sectional view of part of the juncture structure of conventional manifold pipes and the gate pipe.

Referring now to FIG. 1 through 3, an embodiment of the invention is described below.

The pressure molding apparatus for molten resin embodied by the invention is provided with a molding unit composed of lower mold 1 shown in FIG. 1 and an upper mold (not shown).

Gate unit 2 is installed to the predetermined position of the lower mold 1.

Gate spool 3 of the gate unit 2 is coupled to through-hole 1a provided at the predetermined position of the lower mold 1.

Gate aperture 3a is provided at the bottom of the gate spool 3.

Tapered hole 3b having an adequate length and tapered diameter expanding in the direction of the internal bottom surface of the lower mold 1 from the gate aperture 3a is internally provided.

The gate aperture 3a of the gate spool 3 opens and closes at the inclined tip surface 4a of gate pin 4 inserted in gate pipe 5 which is installed beneath the gate spool 3.

The bottom end of the gate pipe 5 is interlinked to the upper tip of manifold pipe 6 by means of mechanism described later on.

Oil-pressurized cylinder 7 moving the gate pin 4 in the vertical direction is secured to the bottom surface of the tip of the manifold pipe 6 via fixing block 8, where the gate pin 4 is vertically inserted in the axial center of the oil-pressurized cylinder 7 in order that the gate pin 4 can be driven in the vertical direction.

A plurality of manifold pipes 6 are installed in parallel with each other.

As shown in FIG. 2, these manifold pipes 6 are respectively connected in the branched condition to a plurality of base pipes 9,9,9 of the molten-resin supply pipeline base composed of these base pipes which are connected to each other on a route via pillar pipe 10.

More particularly, the second and third base pipes 9b and 9c are connected to each other via the pillar pipe 10 at the positions close to both ends of the longitudinal direction of the first base pipe 9a disposed in the center.

One of these manifold pipes, one 6 is connected to the center of the longitudinal direction of the first base pipe 9a via the pillar pipe 10.

Other manifold pipes 6,6,6 are also connected to the positions close to the center of the longitudial direction of the second and third pipes 9b and 9c on both sides via the pillar pipe 10.

Although this embodiment introduces the above mechanism for connecting the base pipes 9 to the manifold pipes 6, the invention does not merely confine the structure to the above, but it also allows introduction of other structures as required.

For example, it is also possible for the invention to introduce six of the base pipes 9 in order to connect each of these to one or more than two of the manifold pipes 6.

As shown in FIG. 3, the embodiment allows the manifold pipes 6 to be connected to the gate pipe 5 by engaging a small cylindrical coupling projection 5a in the bottom end of the gate pipe 5 with a circular recess 6a provided at the upper surface close to the tip of the manifold pipe 6.

In FIG. 1, limit switch 11 having operating arm 11a opposite from the bottom end of the gate pin 4 is installed to the lower position of the oil-pressurized cylinder 7.

The limit switch 11 is operated in such a condition in which the gate pin 5 fully descends itself to fully open the gate aperture 3a.

This in turn activates a molten-resin supply drive source (not shown) connected to the limit switch 11 so that molten resin can be delivered to the interior of the mold unit.

The reference numeral 12 and 14 respectively designate heaters which are disposed by way of surrounding the external periphery of the gate pipe 5.

Molten resin is supplied to the interior of the molding unit of the molten-resin supply system having the above structure by feeding molten resin from the first base pipe 9 to the second and third base pipes 9b and 9c and also to the manifold pipe 6 connected to the first pipe 9a.

Next, molten resin from the second and third base pipes 9b and 9c is delivered to the manifold pipes 6 connected to the second and third base pipes 9b and 9c.

Next, molten resin delivered to these manifold pipes 6 is transferred to the gate pipe 5 coupled to the upper tip portions of these manifold pipes 6.

Next, the gate pin 4 is moved downward by the oil pressurized cylinder 7.

When the gate pin 4 is disengaged from the gate aperture 3a, the gate aperture 3a opens itself.

When the gate pin 4 fully descends, the limit switch 11 of the cylindrical body 13 connected to the bottom end of the gate pin 4 is activated.

When the limit switch 11 is ON, the molten-resin supply drive source (not shown) connected to this limit switch 11 is activated, and as a result, molten resin flows from the gate pipe 5 into the molding unit via the gate aperture 3a and the tapered hole 3b of the gate spool 3.

Since the molten resin supply pipeline base is composed of a plurality of base pipes 9, even if the molten-resin supply pipeline base thermally elongates or contracts itself while supplying molten resin, the length of elongation or contraction can be minimized.

Furthermore, since thermal elongation or contraction can be absorbed by the pillar pipe 10, original positions of the manifold pipes 6 and the gate pipe 5 cannot significantly be displaced, and as a result, there is not obstruction in the supply of molten resin at all.

Flow of molten resin can be smoothed further by providing a molten-resin supply route of each manifold pipe 6 with an adequate diameter suited for each position.

Concretely, by expanding the diameter of the supply routes of these manifold pipes 6 and 6 installed on both sides in the parallel direction so that the diameter can become wider than the diameter of the supply route of the manifold pipe 6 at the center of the parallel direction, flow of molten resin on both sides of the parallel direction can significantly be improved.

Conventionally, flow of molten resin on both sides of the parallel direction is not smooth.

Furthermore, the embodiment provides valves at the tip portion of respective manifold pipes 6 for adjusting volume of molten resin to be supplied to the gate pipe 5.

By virtue of the provision of these valves, the apparatus can properly adjust volume of molten resin to be supplied to the gate pipe 5 connected to these manifold pipes 6, and as a result, the apparatus can securely supply a optimal amount of molten resin.

Those manifold pipes 6 and the gate pipe 5 are connected according to the structure mentioned above.

By virtue of this mechanism, even if the manifold pipes 6 thermally elongate or contract themselves, thermal elongation or contraction is fully absorbed by the pillar pipe 10.

Furthermore, there is no fear of causing molten resin to leak out of the apparatus via a clearance that can potentially be generated at the juncture of the manifold pipes 6 and the gate pipe 5.

ADVANTAGEOUS EFFECT OF THE INVENTION

According to the invention, the molten-resin supply pipeline base is composed of a plurality of base pipes, where one or more than two of the manifold pipes are interlinked to each base pipe in the branched condition and in parallel via the pillar pipe.

As a result, even if the molten-resin supply pipeline base thermally elongates or contracts, length of elongation or contraction of these base pipes can be minimized compared to the case of the conventional molten-resin supply pipeline base composed of single base pipe.

Furthermore, since the thermal elongation or contraction is fully absorbed by the pillar pipe, there is no substantial deviation of the original positions of respective manifold pipes.

In consequence, all the manifold pipes and the gate pipe are constantly retained in the correctly condition.

As a result, there is no fear of causing molten resin to leak out of the juncture between the manifold pipes and the gate pipe.

Even if the manifold pipes thermally elongate or contract themselves, thermal elongating or contraction is fully absorbed by the pillar pipe.

Furthermore, since the manifold pipes and the gate pipes are connected to each other by the engagement of the coupling projection with the concave portion, no clearance can be generated at the coupled juncture due to adverse effect of thermal elongation or contraction, and thus, normal condition of the connection between the manifold pipes and the gate pipe can securely be maintained, and in consequence, external leakage of molten resin can securely be prevented.

Furthermore, even when unwanted load is added to the gate pipe, it is also absorbed by the pillar pipe, thus securely preventing the manifold pipes from incurring damage.

As is clear from the above description, according to the invention, even if either the molten-resin supply pipeline base or the manifold pipes thermally elongate or contract themselves, or even when unwanted load is added to the gate pipe, there is no fear of obstructing smooth supply of molten resin at all.

What is claimed are:

1. A pressure molding apparatus for supplying molten resin to a mold, comprising:
    a gate unit having an aperture therein for passage of molten resin into a mold cavity of the mold;
    a gate pipe connected for communication with said gate unit;
    a gate pin having a gate pin end at one end and a tip at another end thereof, said tip being engagable with said aperture for controlling flow of molten resin through said gate unit;
    a manifold pipe for supplying molten resin to said gate pipe;
    connection means for connecting said gate pipe to said manifold pipe, said connection means including a receiving portion for receiving molten resin from said manifold pipe, said gate pin passing completely through said receiving portion and said gate pin end extending beyond said connection means;
    a coupling projection disposed at the bottom end of said gate pipe, wherein a concave portion is disposed at an upper portion close to the tip of said manifold pipe, and wherein said gate and said manifold pipe are connected to each other by the engagement of said coupling projection with said concave portion;
    limit switch means for detecting movement of said gate pin end to a predetermined position, said limit switch means producing a signal indicative of whether said pate pin end is at said predetermined position; and
    a molten-resin supply means for supplying molten resin to a plurality of mold units, said molten-resin supply means including a first base pipe, a plurality of second base pipes which are each connected for communication with said first base pipe, and a plurality of groups of manifold pipes in which each said group is connected for communication with a respective one of said second base pipes.

2. A pressure molding apparatus for supplying molten resin to a plurality of molds, comprising:
    a molten resin supply means for supplying molten resin to a plurality of mold units, said molten resin supply means including a first base pipe, a plurality of second base pipes which are each connected for communication with said first base pipe, and a plurality of groups of manifold pipes in which each said group is connected for communication with a respective one of said second base pipes; and
    each of said manifold pipes being connected to a respective one of the molds by a gate means;
    a gate unit having an aperture therein for passage of molten resin into a mold cavity of the molds;
    a gate pipe connected for communication with said gate unit;
    a gate pin having a gate pin end at one end and a tip at another end thereof, said tip being engagable with said aperture for controlling flow of molten resin through said gate unit;
    a gate spool which has a gate aperture and is coupled to the through hole, said gate spool having a tapered hole means that is narrow at a gate pin end and wide at a mold cavity end, for preventing the gate aperture from being closed by resin;
    connection means for connecting said gate pipe to said manifold pipe, said connection means including a receiving portion for receiving molten resin from said manifold pipe, said gate pin passing completely through said receiving portion and said gate pin end extending beyond said connection means; and
    limit switch means for detecting movement of said gate pin end to a predetermined position, said limit switch means producing a signal indicative of whether said gate pin end is at said predetermined position.

* * * * *